James Collins. Wheel Pit.

N° 117745     Patented Aug. 8, 1871

Witnesses:
P. C. Dieterich.
Wm. H. C. Smith.

Inventor:
James Collins.
per Munn & Co.
Attorneys.

// 117,745

UNITED STATES PATENT OFFICE.

JAMES COLLINS, OF CRAWFORDSVILLE, INDIANA.

IMPROVEMENT IN WHEEL-PITS FOR SPOKING CARRIAGE-WHEELS.

Specification forming part of Letters Patent No. 117,745, dated August 8, 1871.

*To all whom it may concern:*

Be it known that I, JAMES COLLINS, of Crawfordsville, in the county of Montgomery and State of Indiana, have invented a new and useful Improvement in Wheel-Pit; and I do hereby declare that the following is a full, clear, and exact description thereof, which will enable others skilled in the art to make and use the same, reference being had to the accompanying drawing forming part of this specification, in which—

Figure 1:
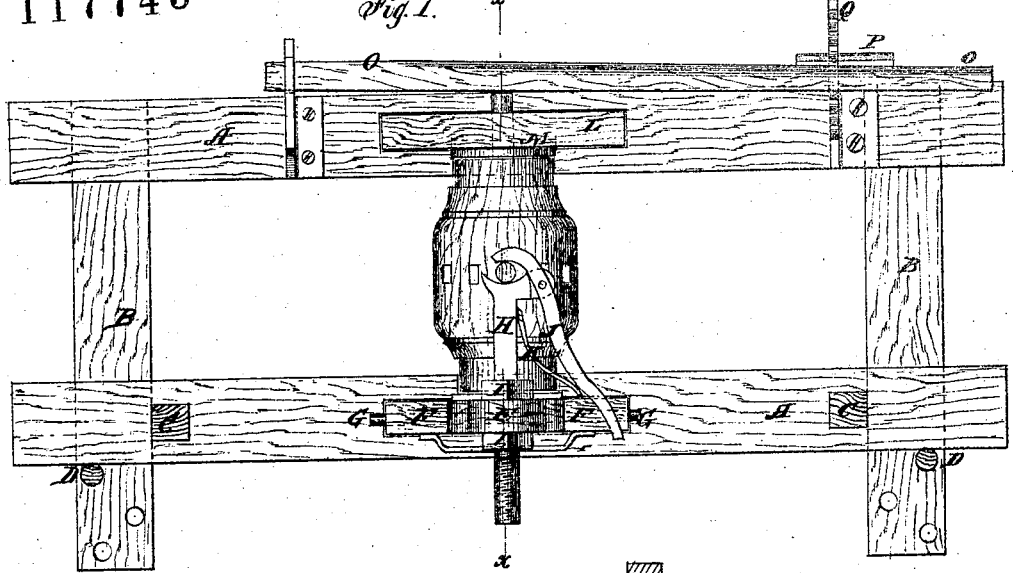
Figure 2:
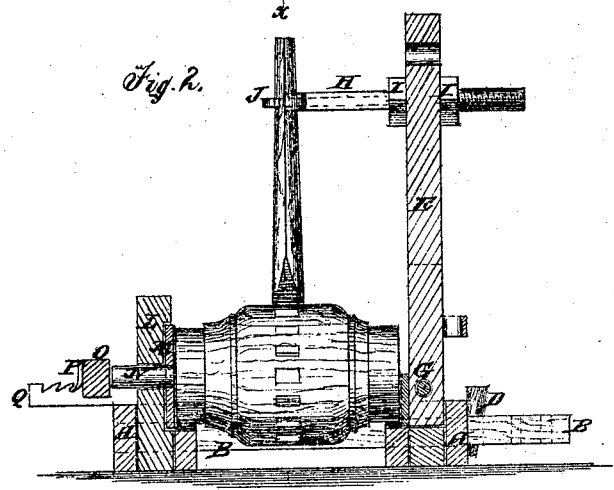
Figure 3:
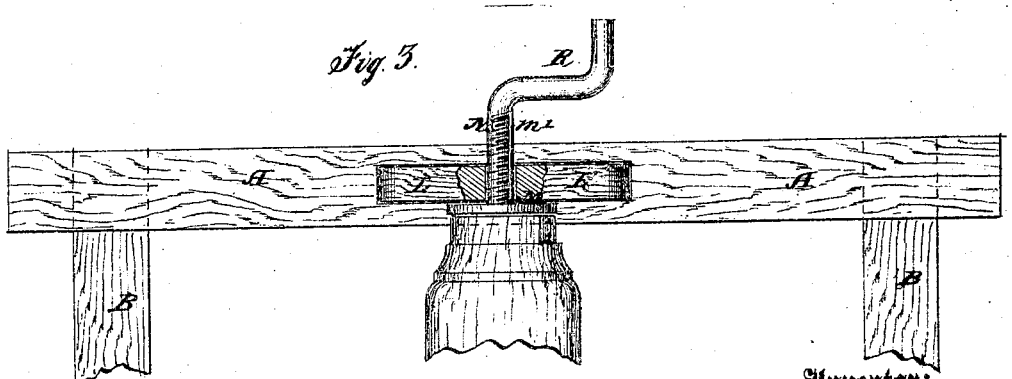

Figure 1 is a top view of my improved machine. Fig. 2 is a vertical cross-section of the same taken through the line $x\,x$, Fig. 1. Fig. 3 is a detail view illustrating a modification of the clamping device.

Similar letters of reference indicate corresponding parts.

My invention has for its object to furnish an improved wheel-pit or apparatus for holding the hubs and spokes of a wheel while the spokes are being driven, which shall be simple in construction, convenient in use, and effective in operation, being so constructed as not only to hold the hub and spokes securely while the spokes are being driven, but also to gauge the dish of the wheel; and it consists in the construction and combination of various parts of the machine, as hereinafter more fully described.

A are the side bars, and B are the cross-bars of the frame of the machine. The cross-bars B are made fast at one end to one of the side bars A. The other ends of the cross-bars B pass through mortises in the other side bar A, and are adjustably secured in place by wedge-keys C and pins D, several holes being formed in the cross-bars B to receive the pins D, so that the machine may be conveniently adjusted according to the length of the hubs to be operated upon. The middle part of the upper sides of the side bars A are recessed to form seats for the ends of the hub while being operated upon. E is the guide-staff or bar, against which the point or outer end of the hub rests. The staff or bar E passes down between the standards F, the lower ends of which are secured to the side bar A of the frame. The bar or staff E is secured to the standards F by a pin, G, which passes horizontally through the said standards and staff about upon a line with the center of the point of the hub. By this construction, as soon as the other or butt end of the hub is pressed against by the clamping device the staff or bar E will adjust itself to the end or point of the hub. H is the guide-pin, the inner end of which is notched or concaved to receive the upper or outer end of the spoke to be held and driven. The other or outer end of the guide-pin H has a screw-thread formed upon it, passes through the upper part of the staff or bar E, and has two nuts, I, screwed upon it, one upon each side of the said bar or staff E, so that, by adjusting the position of the said nuts I, the guide-pin H may be adjusted according to the length of the hub and the dish of the wheel, the said pin thus serving as a gauge to regulate the dish of the wheel. Several holes are formed in the upper part of the staff or bar E to receive the pin H, so that the said pin may be adjusted higher or lower as the length of the spokes may require. The end of the spoke is held in place against the notched or recessed end of the pin H by the lever J, the forward end of which is bent or hooked, as shown in Fig. 1, to pass around the said spoke and hold it securely in place. The hooked lever J is pivoted to the pin H, and is held forward in its place by the spring K attached to the pin H and pressing against the side of the said lever J, as shown in Fig. 1. To the other side bar A of the frame, directly opposite the butt end of the hub, is secured a standard, L, the inner face of which is recessed to receive a small wheel or disk, M, against which the end of the hub rests. The wheel or disk M is swiveled to the end of a rod, N, that passes through a hole in the standard L, and against the outer end of which the side of the lever O rests. The end of the lever O is pivoted to a support attached to the side bar of the frame by being inserted in a hole in said support, or in any other convenient manner. The lever O, near its other end, has a pawl or plate, P, formed upon or attached to it to take hold of the teeth of the rack Q attached to the side bar A of the frame, so that, by adjusting the lever O, any desired amount of pressure may be applied to the end of the hub to clamp it securely in place. If desired, the rod N may have a screw-thread, $n'$, cut upon it to work in a screw-thread or nut in the standard L, in which case a crank, R, is attached to or formed upon the outer end of the said rod N, so that the pressure may be regulated by turning the said crank R. The revolving disk M enables the hub to be pressed with sufficient force against the staff or bar E without unduly increasing the friction.

Having thus described my invention, I claim as new and desire to secure by Letters Patent—

1. The guide-staff or bar E, constructed and operating in connection with the standards F, pin G, and end of the hub, substantially as herein shown and described, and for the purpose set forth.

2. The adjustable supporting and gauge-pin H, nuts 1, lever J, and spring K, constructed and operating in connection with the adjustable guide-staff or bar E and outer ends of the spokes, substantially as herein shown and described, and for the purposes set forth.

JAMES COLLINS.

Witnesses:
FISHER DOHERTY,
JOHN V. KEERAN.